(12) United States Patent
Domo

(10) Patent No.: US 10,355,426 B2
(45) Date of Patent: Jul. 16, 2019

(54) ELECTRICAL TAP BOX ENGAGEMENT SYSTEM AND ASSEMBLY

(71) Applicant: CONSTELLATION INNOVATION, LLC, Chagrin Falls, OH (US)

(72) Inventor: James Domo, Chagrin Falls, OH (US)

(73) Assignee: CONSTELLATION INNOVATION, LLC, Chagrin Falls, OH (US)

( * ) Notice: Subject to any disclaimer, the term of this patent is extended or adjusted under 35 U.S.C. 154(b) by 0 days.

(21) Appl. No.: 15/992,517

(22) Filed: May 30, 2018

(65) Prior Publication Data

US 2018/0351308 A1 Dec. 6, 2018

Related U.S. Application Data

(60) Provisional application No. 62/512,226, filed on May 30, 2017.

(51) Int. Cl.
*H01H 3/06* (2006.01)
*H01H 3/26* (2006.01)
(Continued)

(52) U.S. Cl.
CPC ............. *H01R 13/701* (2013.01); *H01H 3/06* (2013.01); *H01H 3/26* (2013.01); *H01H 3/28* (2013.01);
(Continued)

(58) Field of Classification Search
CPC .... H01R 25/142; H01R 13/71; H01R 13/621; H01R 13/701; H01H 3/06; H01H 3/26;
(Continued)

(56) References Cited

U.S. PATENT DOCUMENTS 6,039,584 A   3/2000  Ross
6,399,882 B1  6/2002  Faulkner et al.
(Continued)

FOREIGN PATENT DOCUMENTS

CN   203026645   6/2013
CN   203165781   8/2013
(Continued)

OTHER PUBLICATIONS

Combined Search and Examination Report under Sections 17 and 18(3)—United Kingdom Intellectual Property Office for UK Patent Application No. 1808813.8.

*Primary Examiner* — Hal Kaplan
(74) *Attorney, Agent, or Firm* — McDonald Hopkins LLC

(57) ABSTRACT

The present disclosure relates to a system of assemblies for remotely actuating a tap box to a continuous access busway. The system includes a tap box having a male component with electric contacts positionable between an engaged position and a disengaged position with a continuous access busway. A remote actuator interface positioned along the tap box for being selectively attached to a remote actuator device for manipulating the male component between the engaged position and the disengaged position. The remote actuator device may be a powered actuator device or an elongated control rod wherein the powered actuator device and elongated control rod may be selectively coupled to the remote actuator interface to manipulate the male component between the engaged position and the disengaged position relative to the continuous access busway from a safe distance to reduce the event of injury due to arch flashing or electrocution.

21 Claims, 14 Drawing Sheets

(51) Int. Cl.
    *H01H 3/38*     (2006.01)
    *H01R 13/70*     (2006.01)
    *H01R 13/71*     (2006.01)
    *H01R 25/14*     (2006.01)
    *H01R 13/621*     (2006.01)
    *H02G 5/08*     (2006.01)
    *H01H 3/28*     (2006.01)

(52) U.S. Cl.
    CPC .............. *H01H 3/38* (2013.01); *H01R 13/71* (2013.01); *H02G 5/08* (2013.01); *H01H 2239/058* (2013.01); *H01H 2300/056* (2013.01); *H01R 13/621* (2013.01); *H01R 25/142* (2013.01)

(58) Field of Classification Search
    CPC ...... H01H 3/28; H01H 3/38; H01H 2239/058; H01H 2300/056; H02G 5/08
    USPC ....................................................... 307/139
    See application file for complete search history.

(56) References Cited

U.S. PATENT DOCUMENTS

| | | | |
|---|---|---|---|
| 6,521,837 B2 | 2/2003 | Hilgert et al. | |
| 7,819,676 B1 | 10/2010 | Cardoso et al. | |
| 8,545,245 B2 | 10/2013 | Dozier | |
| 8,592,707 B2 | 11/2013 | Krütten | |
| 8,664,530 B2 | 3/2014 | Ross et al. | |
| 8,697,993 B2 | 4/2014 | Jur et al. | |
| 8,864,510 B2 | 10/2014 | Walgenbach et al. | |
| 9,190,791 B1 | 11/2015 | Jaena et al. | |
| 9,275,774 B2 | 3/2016 | Ross et al. | |
| 9,362,063 B2 | 6/2016 | Farmer et al. | |
| 9,379,502 B2 | 6/2016 | Davidson et al. | |
| 9,385,517 B2 | 7/2016 | Baldwin | |
| 9,407,079 B1 | 8/2016 | Kokenda et al. | |
| 9,425,603 B2 | 8/2016 | Jur et al. | |
| 9,450,359 B2 | 9/2016 | Rathjen et al. | |
| 9,455,541 B2 | 9/2016 | Rathjen et al. | |
| 9,472,369 B2 | 10/2016 | Dozier et al. | |
| 9,564,726 B2 | 2/2017 | McCauley et al. | |
| 9,564,747 B2 | 2/2017 | Ross et al. | |
| 9,590,405 B1 | 3/2017 | Maurer et al. | |
| 9,692,195 B2 | 6/2017 | Mittelstadt et al. | |
| 9,929,554 B2 | 3/2018 | Ross et al. | |
| 2008/0258667 A1 | 10/2008 | Morris et al. | |
| 2014/0293516 A1 | 10/2014 | Swift et al. | |
| 2014/0321067 A1 | 10/2014 | Leeman et al. | |
| 2015/0311654 A1 | 10/2015 | Mccauley et al. | |
| 2016/0372879 A1 | 12/2016 | Jur | |
| 2016/0372909 A1 | 12/2016 | Baldwin et al. | |
| 2018/0062333 A1 | 3/2018 | Lewis et al. | |
| 2018/0062368 A1 | 3/2018 | Lewis et al. | |

FOREIGN PATENT DOCUMENTS

| | | |
|---|---|---|
| CN | 103198940 | 11/2014 |
| CN | 204407703 | 6/2015 |
| CN | 204407818 | 6/2015 |
| CN | 106972437 | 7/2017 |
| CN | 207021635 | 2/2018 |
| CN | 107785685 | 3/2018 |
| CN | 207166101 | 3/2018 |
| DE | 19956992 | 5/2001 |
| DE | 102006059108 | 6/2008 |
| DE | 102012017122 | 2/2013 |
| DE | 102011085517 | 5/2015 |
| EP | 2385535 | 11/2011 |
| EP | 2571121 | 3/2013 |
| EP | 2593998 | 11/2017 |
| IN | 2008MU01840 | 7/2010 |
| IN | 2012CH03280 | 2/2014 |
| IN | 2013CH00380 | 5/2016 |
| IN | 201621011348 | 10/2017 |
| JP | 3162403 | 9/2010 |

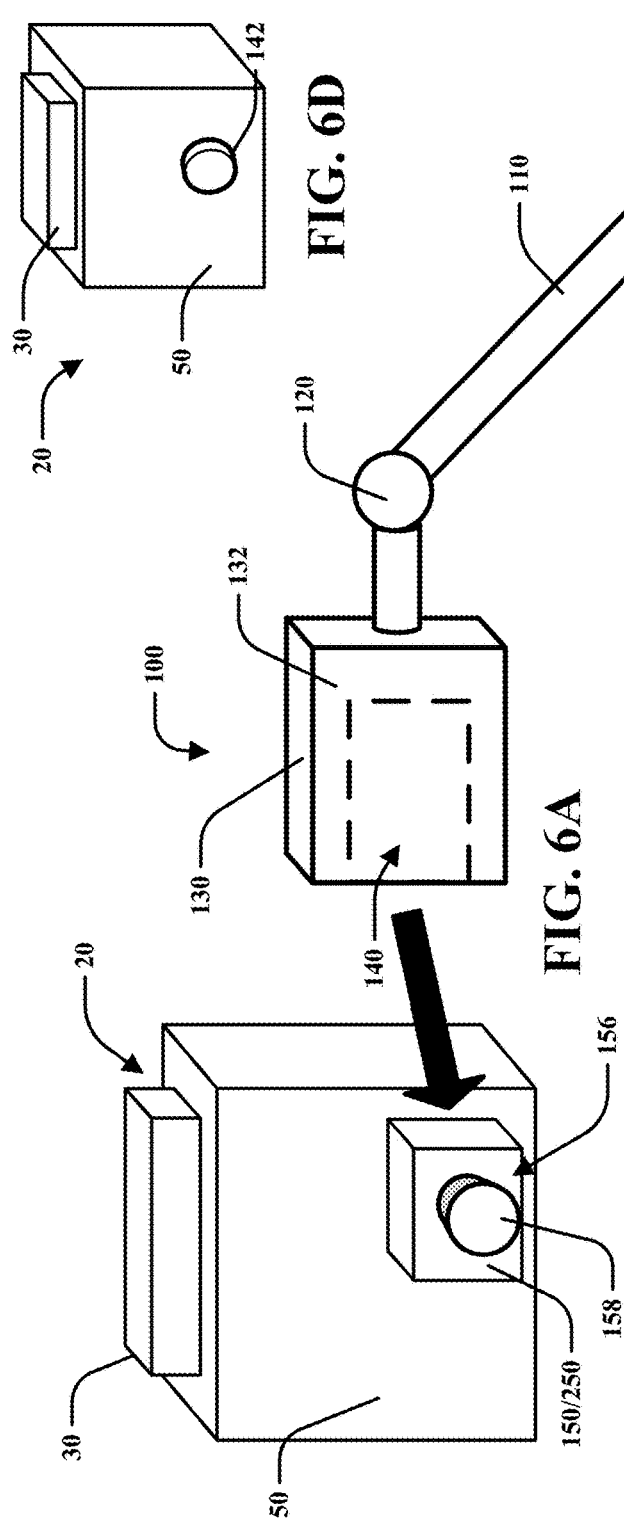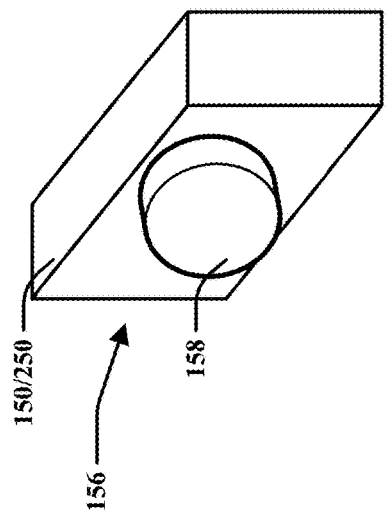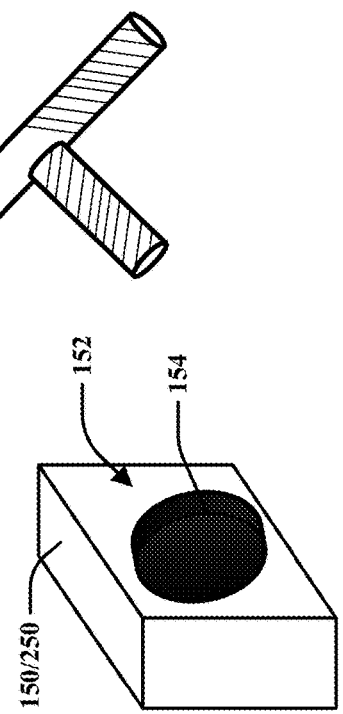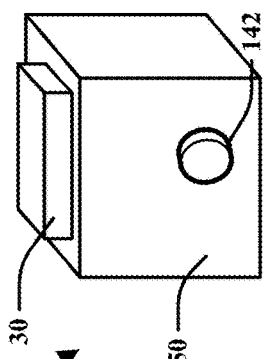

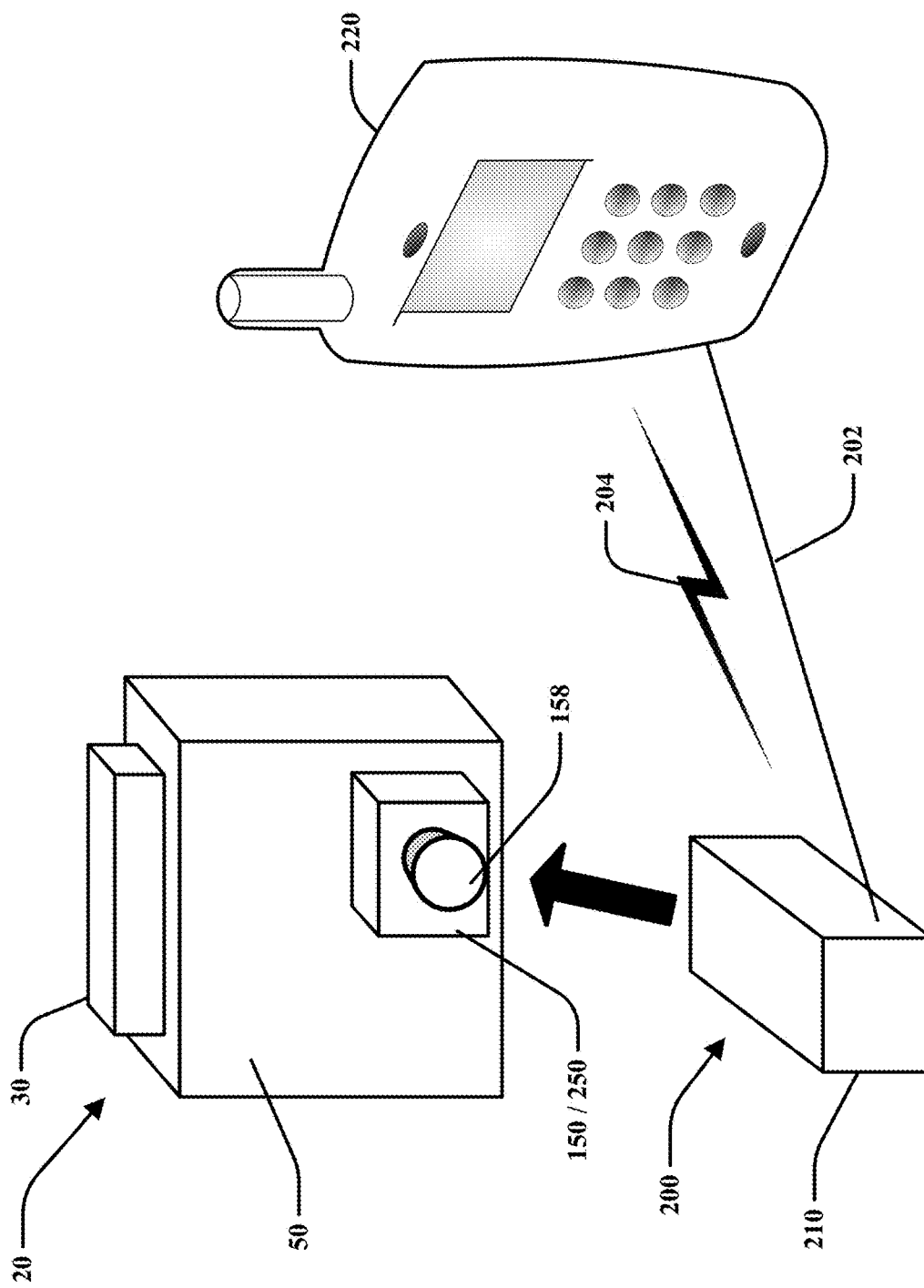

ELECTRICAL TAP BOX ENGAGEMENT SYSTEM AND ASSEMBLY

CROSS-REFERENCE TO RELATED APPLICATIONS

This application claims priority to and benefit of U.S. Provisional Application No. 62/512,226 entitled "ELECTRICAL TAP BOX ENGAGEMENT METHOD AND SYSTEM," filed on May 30, 2017, which is hereby incorporated by reference in its entirety.

TECHNICAL FIELD

The present disclosure relates to safety equipment for coupling an electrical housing to a source. In particular, this disclosure relates to an electrical tap box configured to allow a user to couple and decouple the tap box to the source from a safe distance.

BACKGROUND

The historical approach for electrical distribution systems was to use wiring or enclosed ducts with pre-determined fixed access locations for the purpose of adding sub-circuits. These sub-circuits may utilize wire interfaces or plug-in tap boxes at the pre-determined fixed access locations on a busway for additional power taps to serve sub-circuit loads. High density load applications such as data rooms or in industrial plants has evolved to employ continuous access busway tracks to allow for easy and closely spaced addition and removal of the sub-circuit tap boxes at any location without any pre-determined fixed location limitation along the busway lengths. One example of a continuous access busway 10 is illustrated in FIGS. 1A and 1B. Here, the continuous access busway 10 includes elongated electrical contacts 14 within an elongated body 12. A continuous access busway 10 may be considered a "continuous access" busway if it is configured to selectively engage with tap boxes 20 along any portion of the elongated body 12. Notably, in this example, the elongated electrical contacts 14 extend along sidewalls within the busway to receive outwardly extending contacts from a male component of a sub-circuit tap box positioned within the busway, however, other configurations exist where the elongated electrical contacts 14 may extend along the top walls to receive upwardly extending electrical contacts and various other arrangements exist.

A sub-circuit tap box 20 may be an electrical enclosure that distributes power or communication signals from the busway to specific loads. The tap boxes 20 and continuous access busways 10 may be arranged in a variety of ways but be configured to selectively engage along the continuous access busway 10 with a male component 30 that includes electrical conductor contacts (see prior art FIGS. 2A, 2B, 2C, and 2D). The male component 30 may be electrically connected to elongated contacts 14 within the continuous access busway 10 via manual movement of knobs/handles (located on the tap box) or manual manipulation, such as rotation, of the tap box (FIG. 2D) while the male component is positioned within a cavity 16 of the continuous access busway. Some tap boxes (FIGS. 2A, 2B, and 2C) with handles or knobs do not rotate the male component 30 relative to a body enclosure 50, but the knob/handle movements cause the electrical conductor contacts (located on the male component 30) to be either rotated, translated, or otherwise moved into or out of engagement with the elongated electrical contacts 14 within the continuous access busway 10 to selectively communicate electrically. Generally, the continuous access busways 10 include a frame 18 or some other supporting platform that may be along either side of the continuous access busway 10 to allow for structural attachment to the tap box assemblies 20 that is separate from the selective attachment of the electrical contacts from the male component 30 and the elongated electrical contacts 14.

In one example, as disclosed by U.S. Pat. No. 9,564,726, is a tap box with electrical contacts that are manually selectively translated upwardly from the enclosure body to engage contacts facing downwardly within a continuous access busway. In another example, as disclosed by U.S. Pat. No. 7,819,676, the male component of the tab box extends upwardly from the body enclosure and includes contacts that are manually selectively rotated outwardly from a tower sub-assembly to engage contacts aligned within the continuous access busway. In another example, as disclosed by U.S. Pat. No. 9,379,502, is a tap box with a mast head having electrical contacts extending therefrom where a user inserts the mast head within the busway and manually selectively rotates the enclosure body and mast head to engage contacts within the busway. Each of these patents are incorporated by reference in their entireties.

These types of tap boxes 20 may be used in a data room power distribution system wherein the tap box electrically connects a server rack and its internal components to the busway positioned overhead. (See FIG. 3). The busway may be a continuous rail with integrated power, ground, or communication channel contacts. This application as well as others may utilize busway electrical connections that have loads energized from the busway. These applications may be required to be powered while additional loads are added to the busway. Thus, tap boxes may be inserted and electrically connected into the busways while the busway is energized (live work) so that the existing loads are not de-energized. This enables the addition of tap boxes to serve more loads to existing/active busway systems without disruption to applications that require constant power.

Known or existing tap boxes 20, such as the ones described above, require installation personnel to manipulate the tap box with their hands or use their hands by engaging handles/knobs on the tap box or the tap box itself for coupling and decoupling electrical and mechanical contacts from the elongated electrical contacts 14 within the continuous access busway 10. However, if the busway is energized, the users/installers will be in direct contact near the tap box 20 and energized continuous access busway 10 and therefore in potentially dangerous proximity to arc flash and/or projectiles. This would be especially true, if there is a defect within the tap box 20, or the load has defects to which the tap box is connected. Defects may cause very high energy short circuit currents and arcs to occur creating dangerous arc flash and pressures that can also result in projectiles which may not always be contained within the tap box. A defect caused event can also cause a falling injury or electrical exposure to personnel, since the installations are often conducted while personnel are standing on a ladder or other device.

Common defects may include component failures in the tap box or busway or tap loads, short circuit connections within the tap box, faulty components, mis-wiring, unintended safety grounds installed while energizing, unintentional connections to the tap box, incorrect wiring connections within the tap box, electrical failures connected to the tap box, electrical failures within the tap loads, any unintended connections on the load side of the tap box, disengaging the tap box while the loads are energized, etc. Defects or over rated situations during live tap box engagement or disengagement may potentially result in high energy short circuits, or ground fault currents producing arc flash and high arc plasma pressures.

Considering compliance with NFP 70E and other safety standards such as OSHA while performing live work with today's technology, it is suggested to conduct studies including: calculation of the specific installation's energy potential, arc flash zones evaluations, define the arc flash boundary and requirements for personnel to wear Personal Protective Equipment (PPE) while engaging the tap box to an energized busway. It should be noted the PPE has limitations and may only mitigate injuries since personnel are within arm's length of the tap box.

In view thereof, there exists a need for a tap box assembly and system of such design that affords a solution that overcomes the disadvantages of previously known tap box assemblies.

SUMMARY

The present disclosure relates to a system for remotely actuating a tap box to a continuous access busway. In one embodiment, the system includes a tap box having a male component with electric contacts positionable between an engaged position and a disengaged position. A remote actuator interface positioned along the tap box. A remote actuator device adapted to be selectively coupled to the remote actuator interface to manipulate the male component between the engaged position and the disengaged position relative to the continuous access busway. The remote actuator device includes at least one of a powered actuator device and an elongated control rod. The remote actuator interface may be a coupling device that includes at least one of a lever, knob, or shaft that extends from the tap box, a linkage member that extends from the tap box, an adapter assembly attached to the tap box, and an attachment member. The powered actuator device includes a motor and a drive shaft in rotatable communication with an output interface coupling that is selectively attachable to the remote actuator interface on the tap box. The powered actuator device may be in a wired communication or a wireless communication with a remote controller. The powered actuator device includes at least one battery to power the motor. The elongated control rod includes a coupling head having an engagement interface that may be selectively attached to the remote actuator interface. The elongated control rod includes a plurality of coupling heads each having a different engagement interface wherein the plurality of coupling heads are selectively attachable to a stem member of the elongated control rod. The elongated control rod includes an elongated body having a handle along a proximal end and a universal joint along an opposite distal end, a stem portion attached to the universal joint and a coupling head with an engagement interface selectively attached to the stem portion wherein the universal joint allows the stem portion and the elongated body to pivot relative to one another.

In one embodiment, provided is an assembly for remotely actuating a tap box relative to a continuous access busway comprising a powered actuator device. The powered actuator device includes a housing, a motor, a drive shaft and a mechanical output interface coupling. A remote controller may be in communication with the powered actuator device to selectively actuate the motor to rotate the drive shaft wherein the powered actuator device is adapted to be selectively coupled to a remote actuator interface of a tap box to manipulate a male component between an engaged position and a disengaged position relative to a continuous access busway. The assembly may further include a tap box having a male component with electric contacts positionable between an engaged position and a disengaged position and a remote actuator interface positioned along the tap box wherein the powered actuator device is configured to be selectively attached to the remote actuator interface to manipulate the male component between the engaged position and the disengaged position. The remote actuator interface may be a coupling device that includes at least one of a lever, knob, or shaft that extends from the tap box, a linkage member of the tap box, an adapter assembly, and an attachment member. The tap box includes mechanical drive train components configured to transfer rotation from the powered actuator device to the male component. The male component may be a mast head that is pivotal relative to a body enclosure of the tap box. The mechanical drive train components include at least one of a linkage connection, a beveled gear connection, and a direct drive connection that are in communication with the remote actuator interface. The powered actuator device is selectively removable from a tap box. The remote controller is at least one of a wireless communication with the powered actuator device wherein the powered actuator device includes at least one battery and a wired communication with the powered actuator device wherein at least one of the remote controller and the powered actuator device includes at least one battery.

In another embodiment, provided is a tap box assembly for remotely actuating electrical contacts to a continuous access busway. The assembly includes a tap box having a body enclosure and a male component extending from the body enclosure with electric contacts positionable between an engaged position and a disengaged position. A remote actuator interface positioned along the body enclosure and in communication with mechanical drive train components for manipulating the male component between the engaged position and the disengaged position wherein the remote actuator interface is selectively attachable to a remote actuator device for selectively actuating the mechanical drive train components. The male component may be a mast head that is pivotal relative to a body enclosure of the tap box. The assembly may further include an alignment member attached to the body enclosure of the tap box wherein the alignment member is configured to be inserted within the continuous access busway to align a plurality of electrical contacts from the mast head with a plurality of elongated contacts of the continuous access busway. The mechanical drive train components may include at least one of a linkage connection, a beveled gear connection, and a direct drive connection.

In another embodiment, provided is an assembly for remotely actuating a tap box relative to a continuous access busway. This embodiment includes an elongated control rod including an elongated body having a handle along a proximal end and a universal joint along an opposite distal end. A stem portion attached to the universal joint. A coupling head with an engagement interface selectively attached to the stem portion wherein the universal joint allows the stem portion and the elongated body to pivot relative to one another. The engagement interface may be adapted to be selectively coupled to a remote actuator interface of a tap box to manipulate a male component of said tap box to translate electrical contacts between an engaged position and a disengaged position relative to a continuous access busway. The elongated control rod may include a plurality of coupling heads each having a different engagement interface wherein the plurality of coupling heads are selectively attachable to said stem member of the elongated control rod.

DESCRIPTION OF THE DRAWINGS

The operation of the present disclosure may be better understood by reference to the following detailed description taken in connection with the following illustrations, wherein:

FIG. 6A is a schematic view of an embodiment of a system for manipulating electrical engagement to a continuous access busway assembly that includes a tap box and an elongated control rod in accordance with aspects of the present disclosure;

FIG. 6B is a perspective front view of an embodiment of an adapter assembly for coupling an elongated control rod to a tap box in accordance with aspects of the present disclosure;

FIG. 6C is a perspective rear view of an embodiment of an adapter assembly for coupling an elongated control rod to a tap box in accordance with aspects of the present disclosure;

FIG. 6D is a perspective front view of the tap box of FIG. 6A without an adapter assembly in accordance with aspects of the present disclosure;

FIG. 7 is a schematic view of an embodiment of a system for manipulating electrical engagement to a continuous access busway assembly that includes a tap box and a powered actuator device and an input device in accordance with aspects of the present disclosure;

DETAILED DESCRIPTION

Figure 1A:
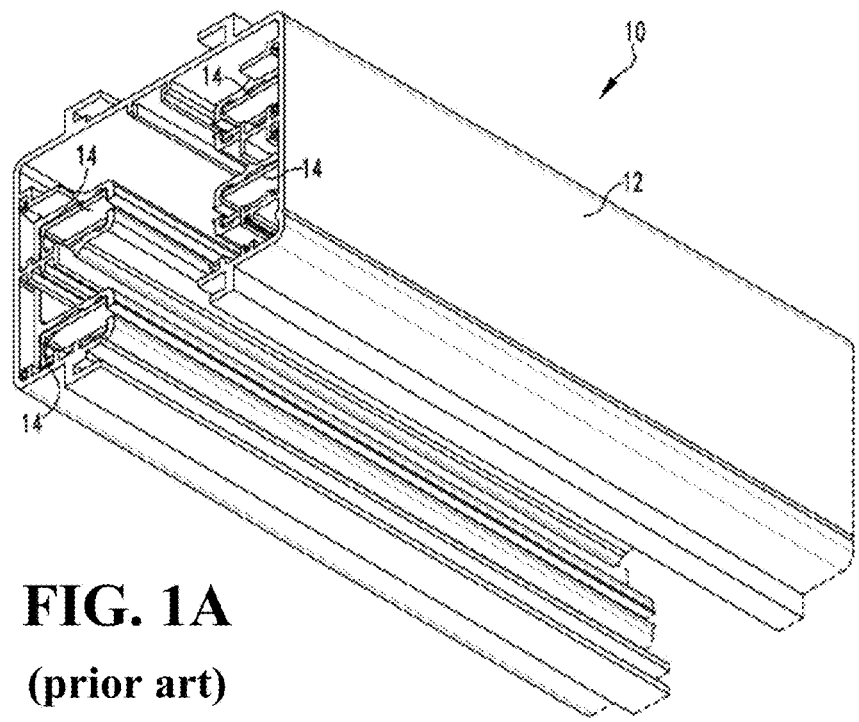
FIG. 1A is a perspective view of an embodiment of a continuous access busway of a known assembly.
Figure 1B:
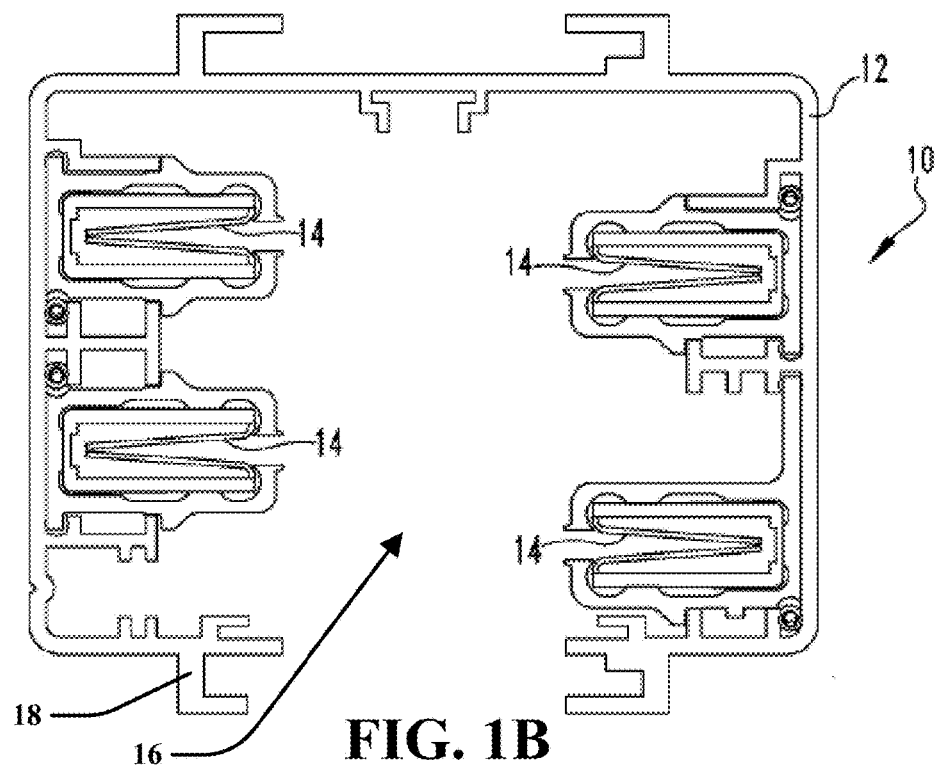
FIG. 1B is an end view of the continuous access busway track of an existing busway assembly of FIG. 1A.

Reference will now be made in detail to exemplary embodiments, examples of which are illustrated in the accompanying drawings. It is to be understood that other embodiments may be utilized and structural and functional changes may be made. Moreover, features of the various embodiments may be combined or altered. As such, the following description is presented by way of illustration only and should not limit in any way the various alternatives and modifications that may be made to the illustrated embodiments.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

Similar reference numerals are used throughout the figures. Therefore, in certain views, only selected elements are indicated even though the features of the system or assembly may be identical in all of the figures. In the same manner, while a particular aspect of the disclosure is illustrated in these figures, other aspects and arrangements are possible, as will be explained below.

The instant disclosure provides a system for safely installing a tap box to a continuous access busway. In one embodiment, the system disclosed herein may allow for selective engagement of the tap box to the continuous access busway along any desired portion thereof while the continuous access busway remains energized to provide power to existing loads. The system allows for remote actuation of various tap box assemblies including known tap boxes, tap boxes modified to include various types of coupling devices, and tap boxes modified to include various types of internal components to impart sufficient engagement or disengagement to allow for remote actuation. The system implements the use of a remote actuator device that is selectively coupled to the various tap box assemblies to allow for remote actuation from a safe distance from an energized system.

In one embodiment, the remote actuator device is an elongated rod assembly (FIG. 4) provided to selectively engage with a remote actuator interface of the various tap box assemblies contemplated herein. Here, an elongated control rod includes a coupling head having an engagement interface that may be attachable to the remote actuator interface of the tap box assemblies. The term "remote actuator interface" is used herein to refer to various types of coupling devices and may include levers, knobs, or shafts that extend from known tap boxes to allow a user to manipulate a male component to electronically couple or de-couple the male component to the continuous access busway. The "remote actuator interface" may also include a linkage member as described below, an adapter assembly added in place of the existing levers, knobs, or shafts of known tap boxes, or an attachment member that is used for tap boxes with various internal components as described herein.

Figure 12:
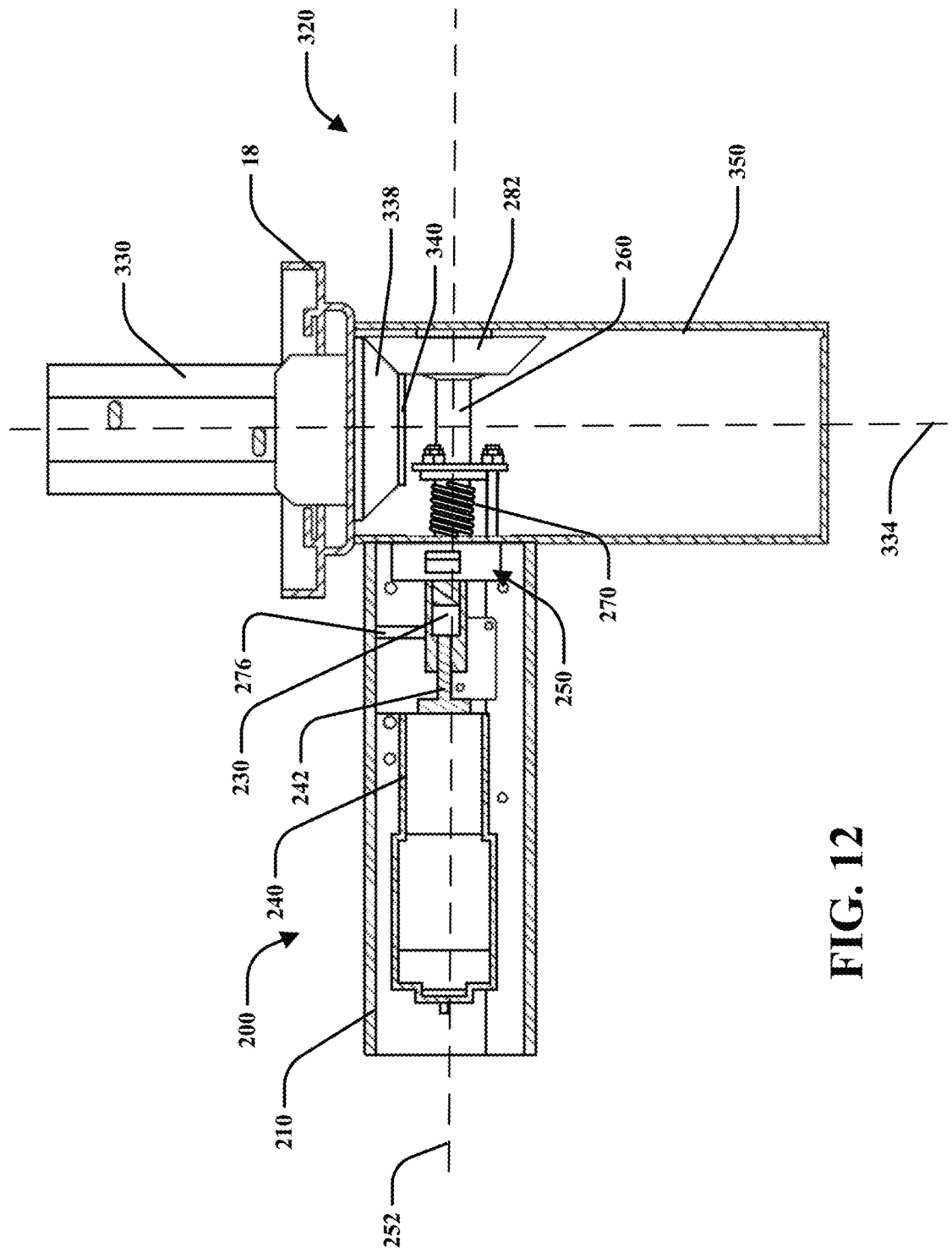
FIG. 12 is a cross sectional side view of an embodiment of the side mounted powered actuator device attached to a tap box assembly in accordance with the present disclosure.
Figure 13:
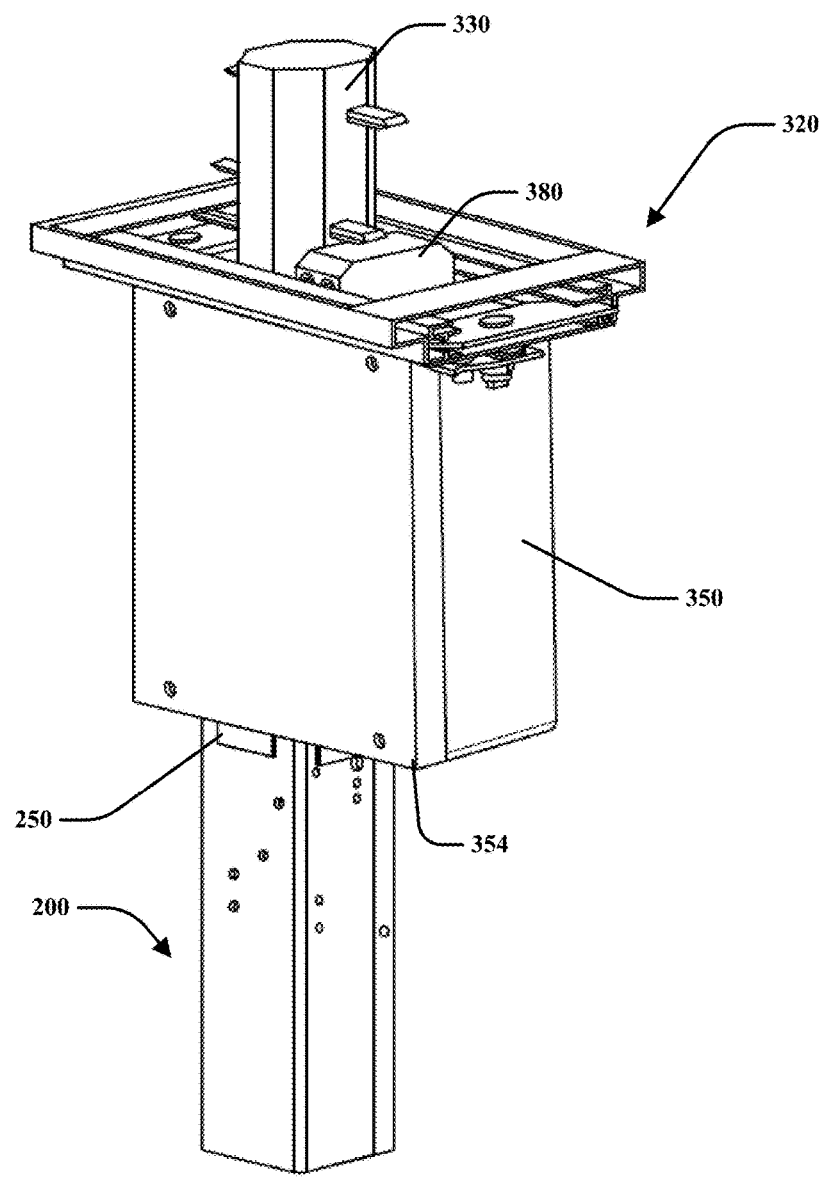
FIG. 13 is a perspective view of an embodiment of a bottom mounted powered actuator device and a tap box assembly attached to a portion of a continuous access busway in accordance with aspects of the present disclosure.
Figure 14:
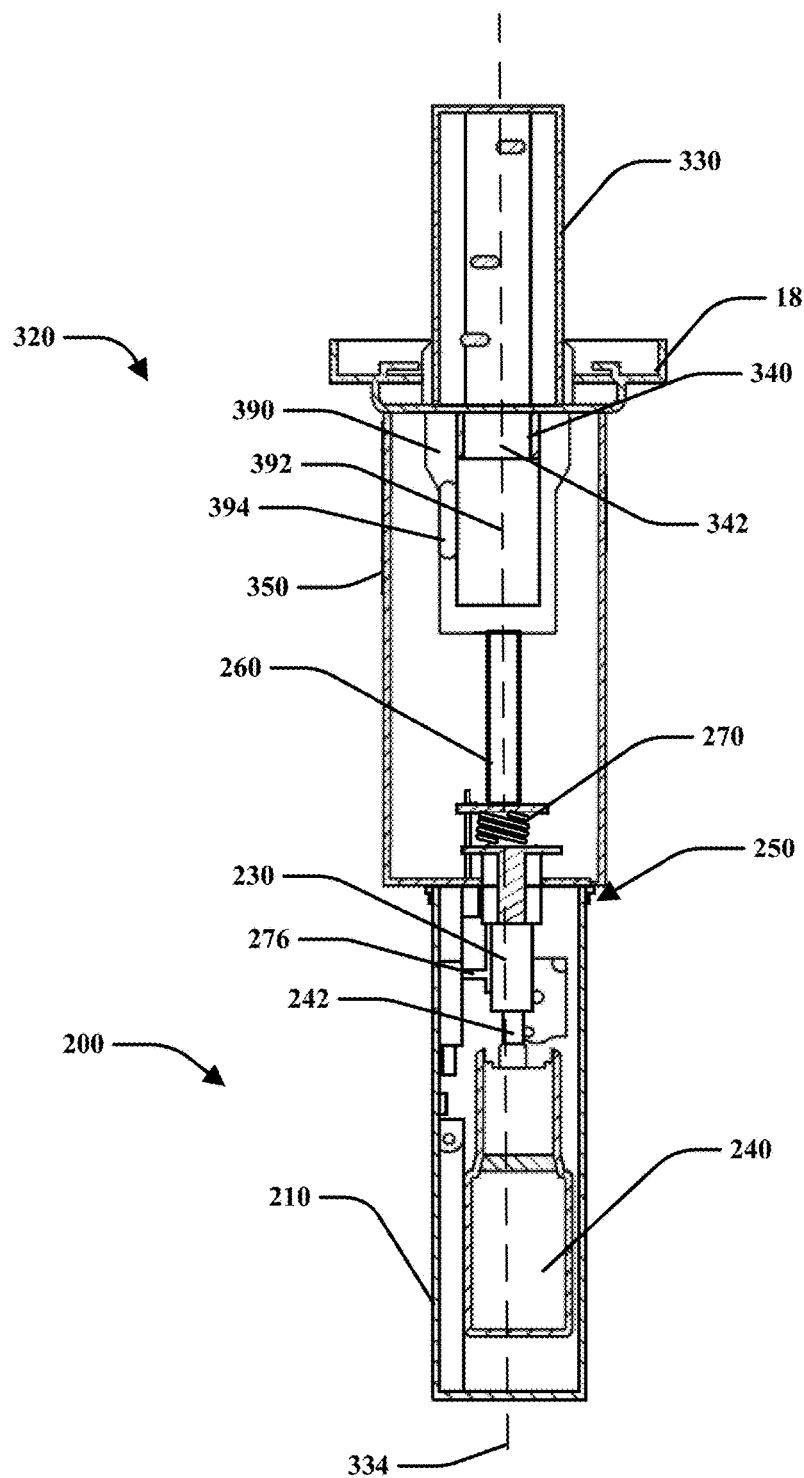
FIG. 14 is a cross sectional side view of an embodiment of the bottom mounted powered actuator device attached to a tap box assembly in accordance with the present disclosure.

In another embodiment, the remote actuator device is a powered actuator device (FIGS. 7 and 8) that is provided to selectively engage with the operable interface of the various tap box assemblies. The powered actuator device may be selectively attached to the remote actuator interface of a known tap box, a remote actuator interface, such as an adapter assembly added to a known tap box (FIG. 7), or to a remote actuator interface of a tap box having internal drive components as provided by the present disclosure (FIGS. 12, 13, and 14). The powered actuator device may allow a user to remotely actuate electrical contacts from a male component of the tap box into engagement or disengagement with elongated contacts or bus along the continuous access busway.

The disclosed system increases safety so that personnel may assume a safe or a remote distance during the electrical engagement or disengagement of the tap box to the continuous access busway while the continuous access busway may remain energized. This allows for power to be maintained to existing loads while additional loads may be added or removed from a powered system. The disclosure of engaging (or disengaging) a tap box using remote control operation with either a powered actuator device or by manual mechanical operation with an elongated control rod, allows for live continuous access busway installation of tap boxes with personnel beyond the arc flash zone at a safe distance in the event of defects that result in arc flash and/or projectiles. The elongated control rod and powered actuator device reduces the risk of injury experienced with known hands-on operation by providing mechanical interfaces to enable remote electrical control and/or manual remote mechanical operation.

Figure 2B:
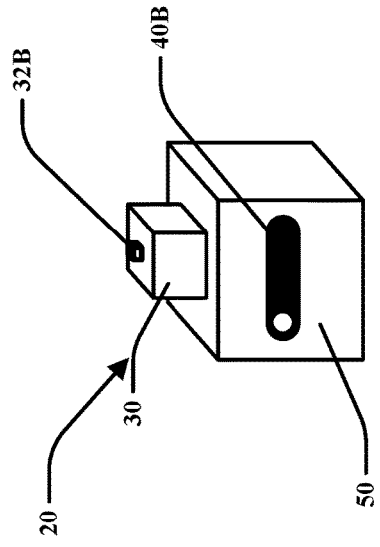
FIG. 2B is a front view of an embodiment of a known tap box for an existing busway assembly.
Figure 2D:
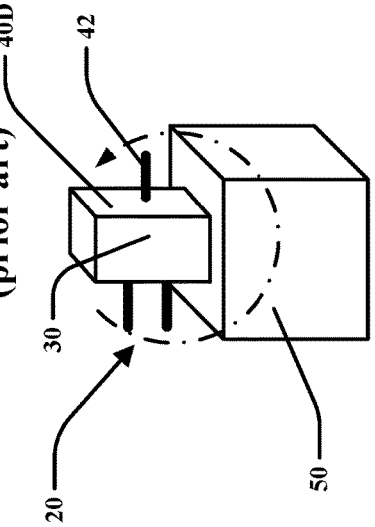
FIG. 2D is a front view of an embodiment of a known tap box for an existing busway assembly.
Figure 2A:
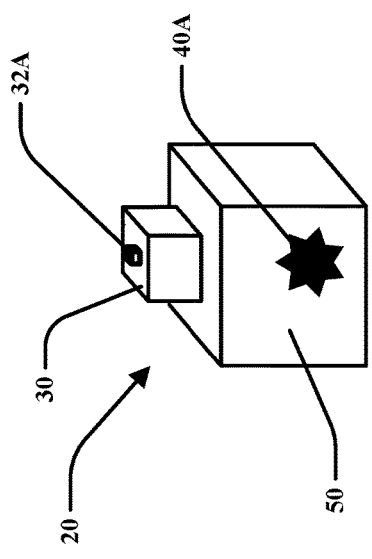
FIG. 2A is a front view of an embodiment of a known tap box for an existing busway assembly.
Figure 2C:
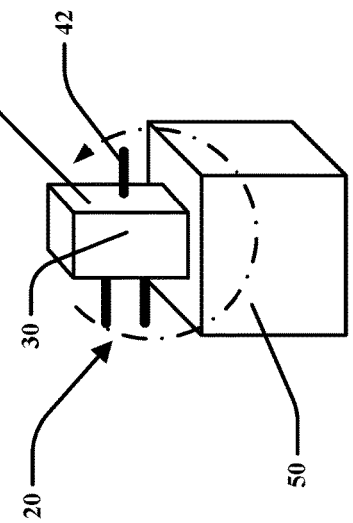
FIG. 2C is a front view of an embodiment of a known tap box for an existing busway assembly.
Figure 3:
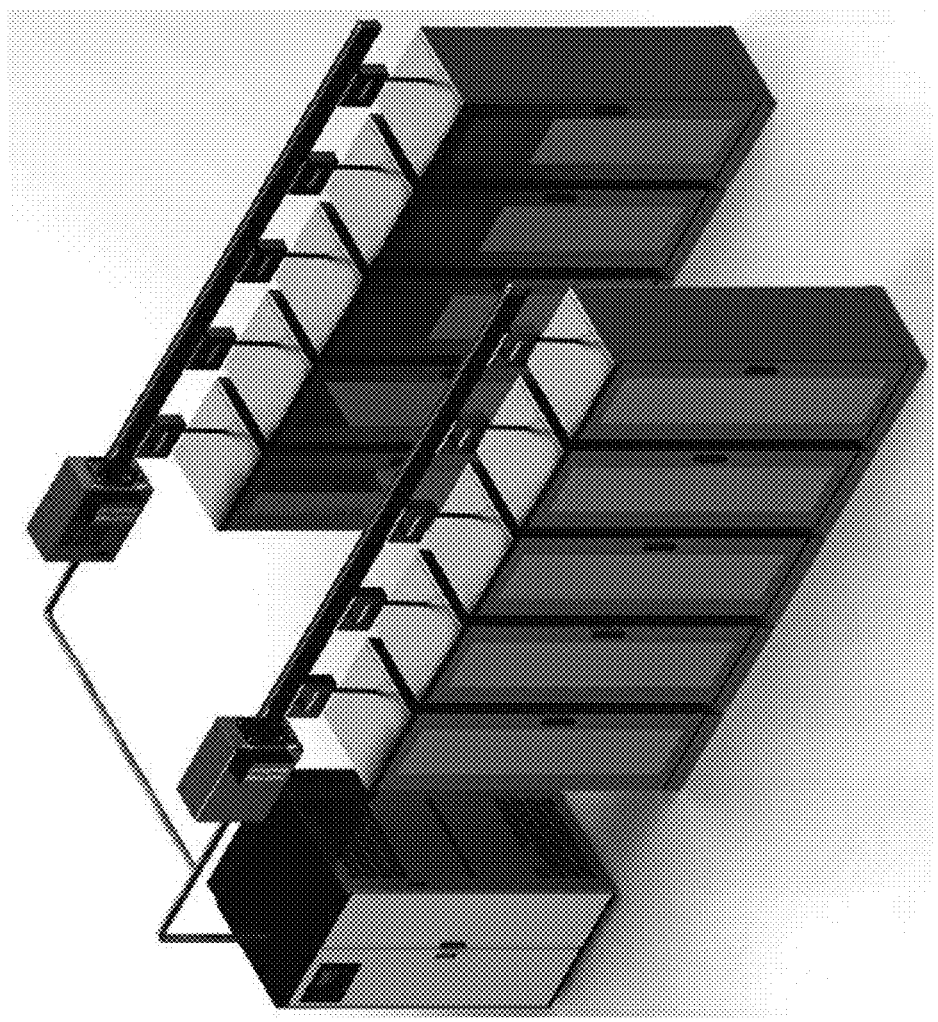
FIG. 3 is a perspective view of an embodiment of a known continuous access busway assembly installed over rows of server cabinets.

The levers, knobs, and shafts of known tap box assemblies 20 include mechanical interfaces 40A, 40B, 40C that extend from the body enclosure 50 (See FIGS. 2A, 2B, and 2C). Examples of these mechanical interfaces and respective male components may be illustrated in the following U.S. Pat. Nos. 9,564,726; 7,819,676; and U.S. Pat. No. 9,379,502 described above. Each mechanical interface may have a different operation to cause the electrical contacts (not shown in FIGS. 2A, 2B, 2C) to engage and disengage from the continuous access busway 10. FIG. 2A illustrates a mechanical interface 40A that is a knob in which a user manually rotates the knob to allow electrical contacts 32A to extend from the male component 30 either upwardly or outwardly to selectively engage with electrical contacts within a continuous access busway. FIG. 2B illustrates a mechanical interface 40B that is a handle in which a user manually rotates the handle to allow electrical contacts 32B to extend from the male component 30 either upwardly or outwardly to selectively engage with electrical contacts within a continuous access busway. Similarly, FIG. 2C illustrates a mechanical interface 40C that is a sliding knob in which a user manually rotates and translates the sliding knob to allow electrical contacts 32C to extend from the male component 30 either upwardly or outwardly to selectively engage with electrical contacts within a continuous access busway. FIG. 2D illustrates a mast head 40D that is rigidly attached to the body enclosure 50 wherein the mast head 40D is inserted into the cavity 16 of the continuous access busway 10 and rotated about 90 degrees to allow electrical contacts 42 extending from the mast head 40D to engage with elongated contacts 14 therein.

Figure 4:
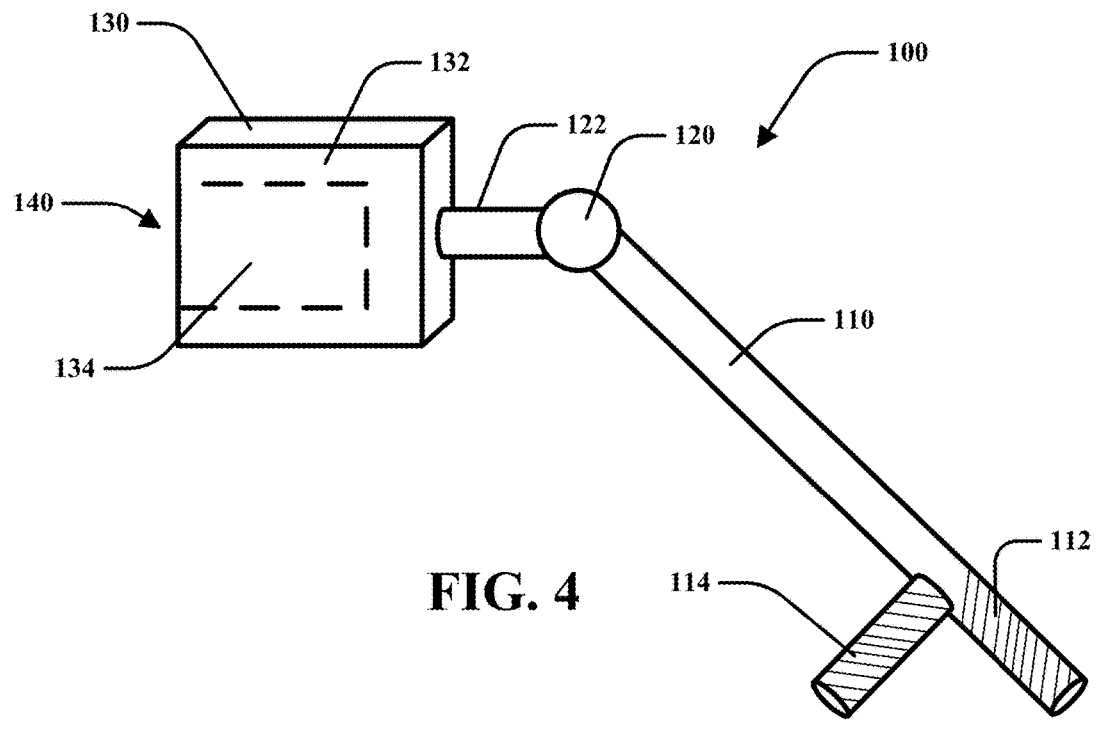
FIG. 4 is a side view of an embodiment of an elongated control rod for engaging and manipulating a tap box for manipulating electrical engagement to a continuous access busway assembly in accordance with aspects of the present disclosure.
Figures 5A, 5B:
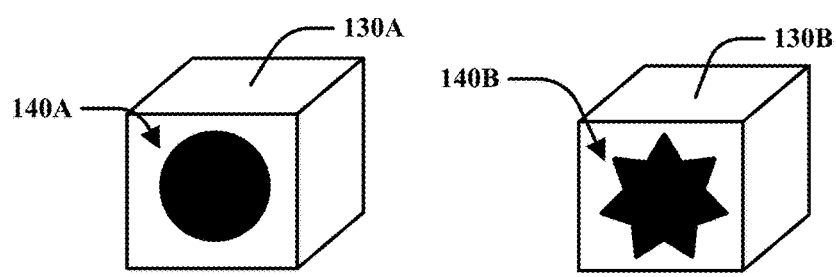
FIG. 5A is a front view of an embodiment of a coupling interface head for an elongated control rod in accordance with aspects of the present disclosure.
FIG. 5B is a front view of an embodiment of a coupling interface head for an elongated control rod in accordance with aspects of the present disclosure.
Figures 5C, 5D, 5E:
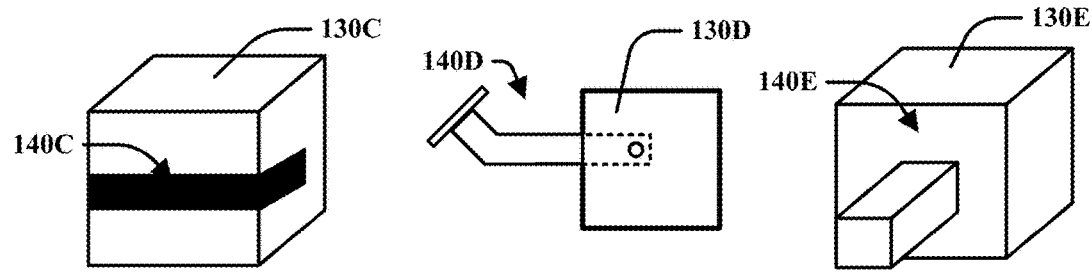
FIG. 5C is a front view of an embodiment of a coupling interface head for an elongated control rod in accordance with aspects of the present disclosure.
FIG. 5D is a front view of an embodiment of a coupling interface head for an elongated control rod in accordance with aspects of the present disclosure.
FIG. 5E is a front view of an embodiment of a coupling interface head for an elongated control rod in accordance with aspects of the present disclosure.

FIG. 4 illustrates an elongated control rod 100 that includes an elongated body 110 having a handle 112 along a proximal end and a universal joint 120 along an opposite distal end of the elongated body. The handle 112 may shaped to allow a user to easily grasp the control rod 100 for manual operation thereof. In one embodiment, the handle 112 may include a protrusion 114 to allow a user to grasp the control rod 100 with both hands to allow for rotational operation as well as translational operation. The universal joint 120 may be attached to a stem member 122 and allow the stem member 122 to be rotatable and pilotable relative to the elongated body 110. The universal joint 120 may allow for moveable or sliding operation as personnel may be positioned at various angles relative to the tap box. A coupling head 130 may be selectively attached to the stem member 122. The coupling head 130 may include an engagement interface 140 that is configured to be selectively operably coupled to the respective levers, handles, knobs, and shafts of known tap boxes. The coupling head 130 may be known as an interchangeable coupling head 130 that includes a rigid tool body 132 with either a shaped recess 134 for coupling to protrusions or a shaped protrusion (140D) for coupling with apertures/recesses. The tool body 132 may be selectively attached to the stem member 122 such that various coupling heads 130 may be mounted to the elongated control rod 100.

Various embodiments of coupling heads 130 having different configurations of engagement interfaces 140 are disclosed by FIGS. 5A, 5B, 5C, 5D, and 5E. These engagement interfaces 140A-140E may be coupled to the various mechanical interfaces 40A, 40B, 40C (FIGS. 2A-2C) to allow for the spaced manual manipulation of the known tap boxes. These embodiments may be utilized without compromising the quick installation and removal of known tap boxes. The engagement interface 140 allows for sufficient operable engagement with the respective lever, knob or shaft of the tap box with the elongated control rod 100. As illustrated by FIGS. 5A through 5E, the engagement interfaces 140A-140E may be configured to couple or mate with various shaped mechanical interfaces 40A, 40B, 40C of existing tap boxes including a rounded or ring shape 140A, socket/hexagonal type shape 140B, a slot shape 140C, an extended pin 140D (is illustrated with a pin and may be hook shaped for extending within an aperture formed within a handle or lever of an existing tap box) or an extended box shape 140E. However, the engagement interfaces 140 may incorporate various other configurations and this disclosure is not limited in this regard.

The elongated control rod 100 may be a fixed length or may be of telescoping length to extend its dimension. The elongated control rod 100 may be about 3 feet long to about 20 feet or more and may also be about 6 or 10 feet long to allow a user to be sufficiently spaced from the continuous access busway and to operate the elongated control rod 100. Additionally, personnel may be located on a ground floor as the tap box is positioned overhead. This configuration may provide significant personal distance from the tap box. Additionally, the elongated control rod 100 may include components that are formed from insulating material such as fiberglass to reduce a risk of a circuit forming between the continuous access busway, tap box assembly, and personnel.

FIGS. 6A, 6B, 6C, and 6D illustrate an embodiment of the disclosed system in which an existing tap box assembly 20 may be modified to include an adapter assembly 150. This system allows for hands-off electrical engagement and disengagement of the tap box from the continuous access busway from a safe distance. As illustrated by FIG. 6A, the adapter assembly 150 may be installed on the body enclosure 50 of a tap box 20 in which an existing mechanical interface (40A, 40B, 40C) may be removed therefrom. FIG. 6D illustrates the tap box 20 having its mechanical interface (40a, 40B, 40C) removed thereby exposing a linkage member 142 configured to manipulate the male component 30 of the tap box 20. As illustrated by FIG. 6C, the adapter assembly 150 may include an interior surface 152 attachable to the body enclosure 50 and a matable portion 154 that may be attached to and matingly coupled with the linkage member 142 that operably extends from and within the body enclosure 50. As illustrated by FIG. 6B, the adapter assembly 150 may include an exterior surface 156 with an external matable portion 158 that may be selectively coupled with the engagement interface 140 of the coupling head 130 of the elongated control rod 100 as illustrated by FIG. 6A. The adapter assembly 150 may be configured to couple or be matingly received with various types and configurations of linkage members 142 from known tap box assemblies 20 as well as various types and configuration of engagement interfaces 140 from the coupling head 130 of the elongated control rod 100. The mating/coupling of the adapter assembly 150 allows for the user, through the elongated control rod 100, to transfer torque, rotation, or pivotal movement to the linkage member 142 of the body enclosure 50 to selectively manipulate the male component 30 of the tap box 20. When not in use, the adapter assembly 150 may be powered from the body enclosure 50 and the existing mechanical interface (40A, 40B, 40C) may be re-attached thereon. This may assist when a plurality of tap boxes exist along a continuous access busway system.

FIG. 7 illustrates an embodiment of the disclosed system that incorporates a powered actuator device 200. This system allows for hands-off electrical engagement and disengagement of the tap box from the continuous access busway from a safe distance. The powered actuator device 200 may include a housing 210 that may be temporarily or permanently mounted to the adapter assembly 150 the tap box 20. Additionally, the powered actuator device 200 may be temporarily or permanently mounted to an attachment member 250 for various tap box assemblies as illustrated by FIGS. 8-15. Further, the power actuator device 200 may be temporarily or permanently mounted to the linkage member 142 of a known tap box 20 that has had its mechanical interface removed therefrom. It is further contemplated that the powered actuator device 200 may be configured to interface with various levers, knobs, or shafts (40A, 40B, 40C) of known tap boxes 20 as illustrated by FIGS. 2A, 2B, and 2C. The powered actuator device 200 may be in communication with a remote controller 220 to allow personnel to control the actuator device 200. The remote controller 220 may communicate via wired 202 or wireless 204 communication with the actuator device 200. As illustrated by FIG. 7, the remote controller 220 may be wired or wirelessly connected to the remote control drive device. The remote controller 220 may include a battery (rechargeable on non-rechargeable replaceable cells), battery charging circuit (for use on-rechargeable cells), pushbutton commands to operate the motor 240 to electrically engage or to electrically disengage the tap box from the continuous access busway. In a wired connection, either the remote control or powered actuator device 200 may include the battery to drive the motor and provide optional circuitry for position feedback.

Figure 8:
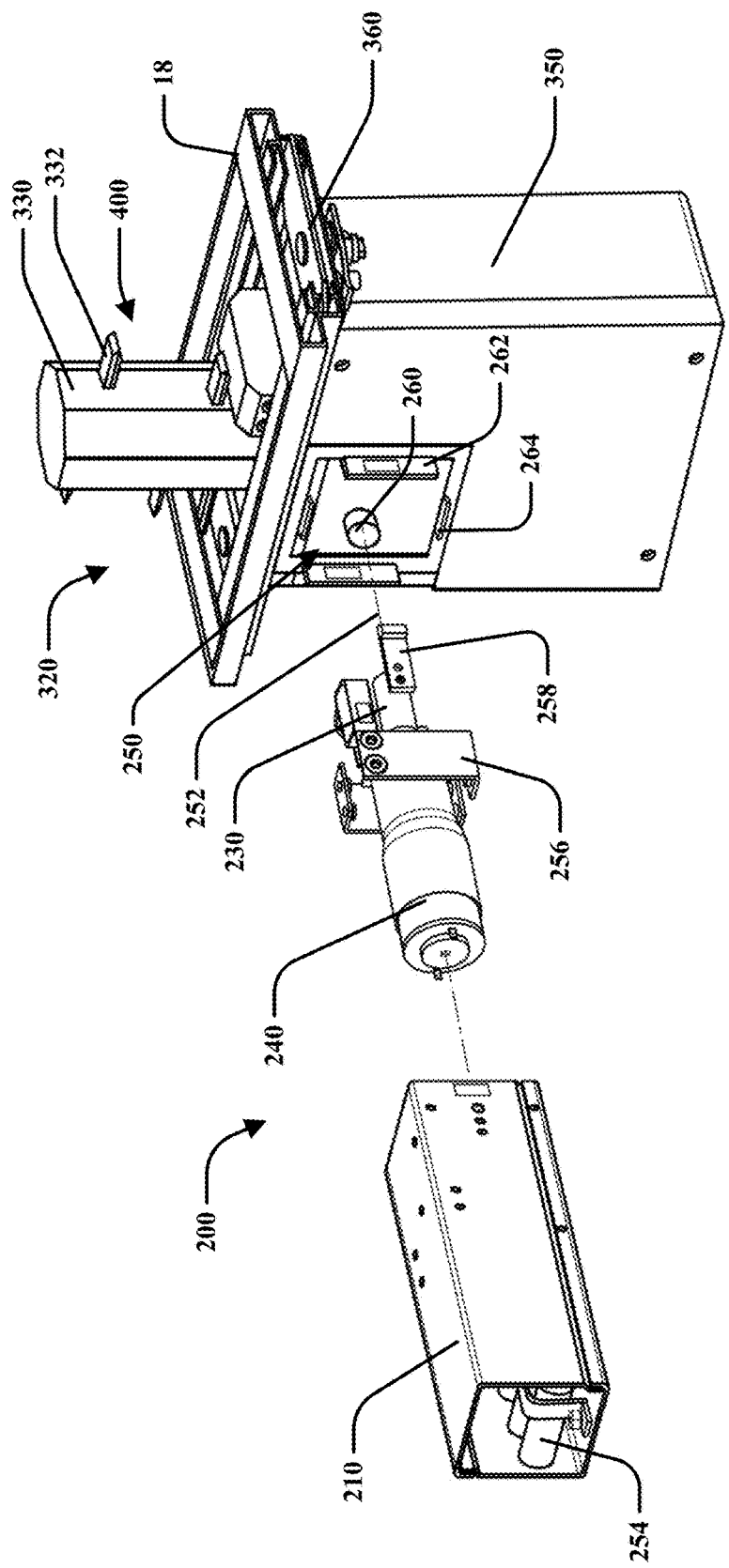
FIG. 8 is an exploded perspective view of an embodiment of a powered actuator device and a tap box assembly in accordance with aspects of the present disclosure.

In one embodiment, the powered actuator device 200 may include a mechanical output interface coupling 230 that is adapted to interface with the remote actuator interface. The remote actuator interface may be either the adapter assembly 150 (illustrated by FIG. 7), the attachment member 250 (as illustrated by FIGS. 8-15) or the linkage member 142 of an existing tap box 20. With reference to FIG. 8, the powered actuator device 200 is illustrated in an exploded view along the rotable axis 252. Here, the mechanical output interface coupling 230 is aligned with a link shaft 260 that protrudes from a body enclosure 350 of a tap box 320. The adapter bracket 250 may be positioned in alignment with the link shaft 260 and is configured to be attached, such as by snap fit, with the housing 210 of the powered actuator device 200. The tap box embodiments illustrated by FIGS. 8-15 include various embodiments of mechanical drive train components configured for operating with the actuator device 200 as will be discussed more fully below. These embodiments include the capability to remotely manipulate a rotatable mast head 330 mounted to the tap box 320 to engage or disengage electrical contacts 332 from the continuous access busway from a safe distance. However, it should be appreciated that these components may also be arranged to toggle electrical contacts in various ways (such as those disclosed by the prior art tap boxes discussed above) while configured to be selectively coupled to and manipulated by the powered actuator device 200.

The powered actuator device 200 may include a motor 240 that rotates a drive shaft 242 along a rotation axis 252 that is in communication with the mechanical output interface coupling 230. The motor 242 may be an electric motor or may be an electric solenoid assembly that imparts rotational movement to the drive shaft 242. The interface coupling 230 may be coupled to and rotate the link shaft 260 that extends from the tap box 320. The output interface coupling 230 may include different interface shapes to engage various tap box's interface member (such as a hex, square, slotted, keyed, etc.) for different tap box versions. A mounting bracket 256 may be used to mount the motor 240 within the housing 210 to maintain the alignment of the motor 240 and drive shaft 242 within the housing 210.

The housing 210 may be configured to be selectively attached to the tap box 320 for operation. Retaining members 258 may extend from the housing 210 to be aligned with and selectively attachable to connection projections 262 that extend from the attachment member 250. Additionally, alignment projections 264 may extend from the attachment member 250 to align with the housing 210 and assist to support the powered actuator device 200 to allow for sufficient operation. However, various other selectable fastening configurations are contemplated by the applicant and the disclosure is not limited in this regard. These mechanisms allow for the mechanical output interface coupling 230 to be sufficiently aligned and coupled to the link shaft 260 such that, when the motor 240 is operated by the remote controller 202, sufficient torque may be provided to rotate the drive shaft 242, mechanical output interface coupling 230, and link shaft 260 along with series of links or gears internal to the body enclosure 250 to pivot the mast head 330 to engage or disengage the electrical contacts 332 relative to elongated contacts 14 the continuous access busway 10 without over or under rotating or pivoting. Further, the retaining members 258 may allow for quick attachment and release of the powered actuator device 200.

Figure 15:
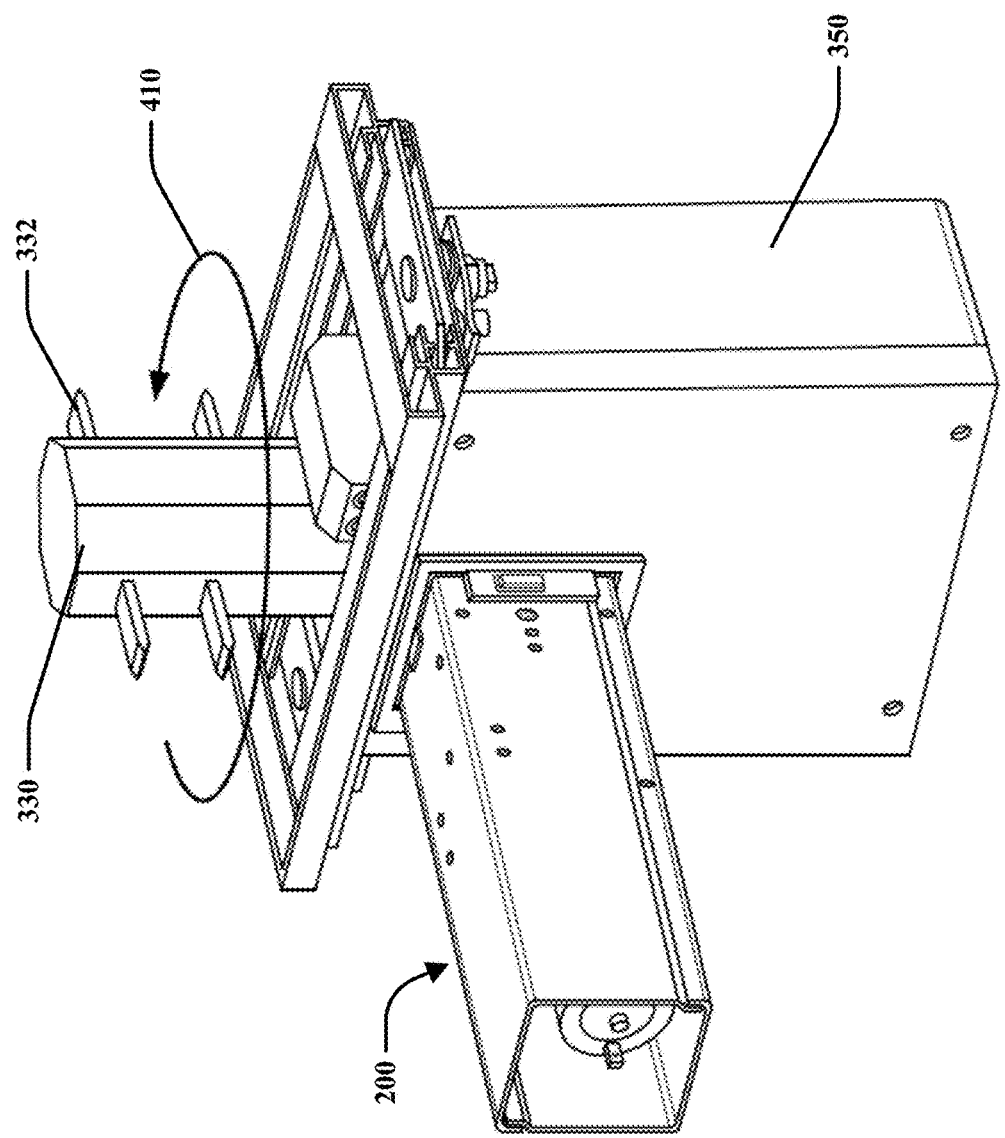
FIG. 15 is a perspective view of a male component of a tap box assembly rotated about 90 degrees in accordance with the present disclosure.

Notably, FIG. 8 illustrates the tap box 350 attached to the frame 18 of the continuous access busway 10 in which the remaining portions of the continuous access busway 10 are not shown. Here, the electrical contacts 332 and mast head 330 are positioned in the disengaged position 400. FIG. 15 illustrates the mast head 330 and electrical contacts 332 pivoted or rotated about 90 degrees in the engaged position 410 (continuous access busway not shown).

Figure 9:
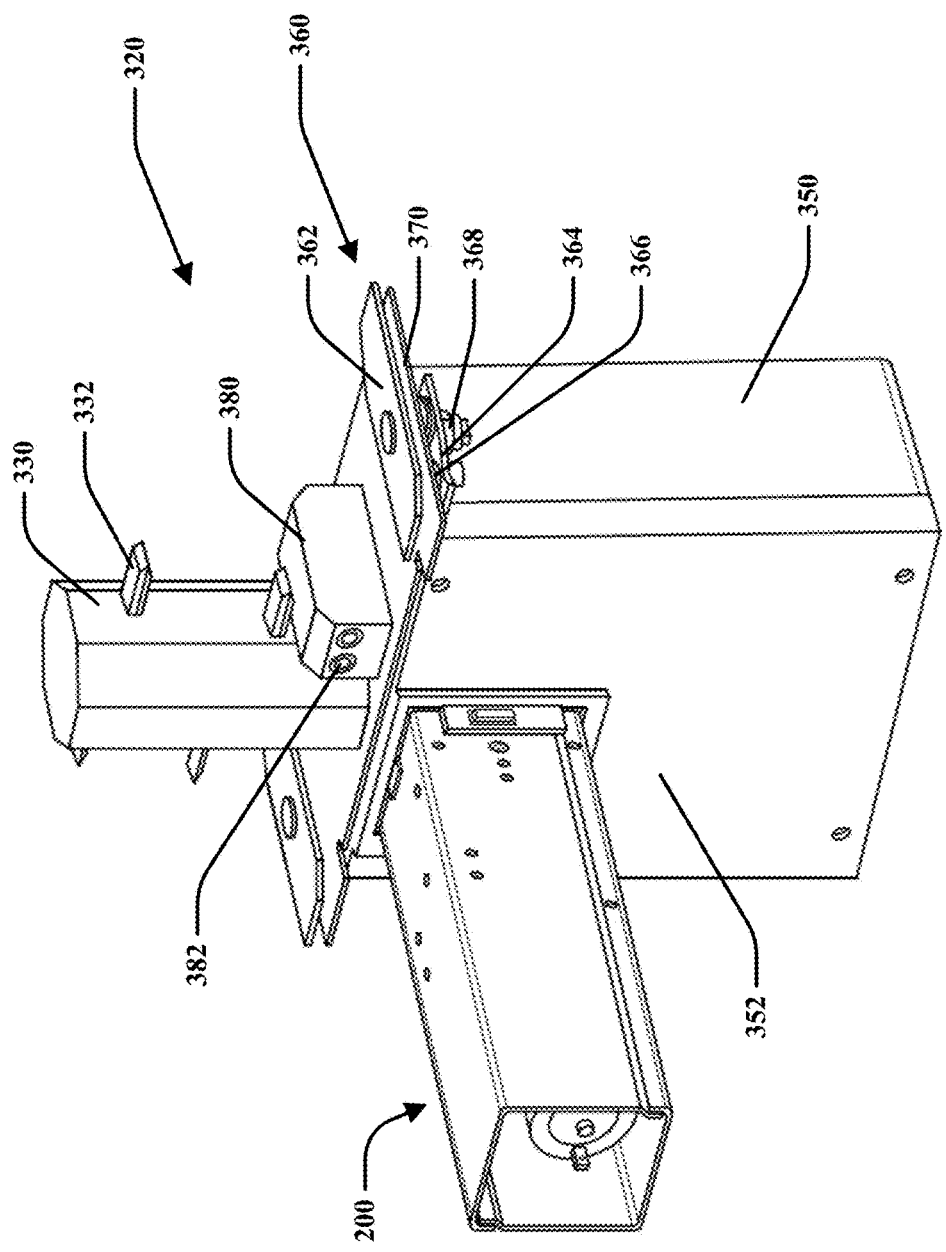
FIG. 9 is a perspective view of an embodiment of a powered actuator device and a tap box assembly in accordance with aspects of the present disclosure.

Turning to FIG. 9, illustrated is the tap box 320 with the powered actuator device 200 attached to a side 352 of the body enclosure 350. The tap box 320 is illustrated without the frame 18 of the continuous access busway 10. The tap box 350 includes a multi-component assembly 360 that may include fasteners or clamps to properly secure the tap box 350 to the frame 18 of the continuous access busway 10. Various embodiments of the multi-component assembly 360 are contemplated in this application and this system is not limited to the features disclose herein as various other hardware fasteners and clamps may be used to secure the tap box 350 to the busway 10 to ensure that any vibrations, external forces, gravity, or loads do not cause the tap box 320 be unintendedly be removed from the continuous access busway 10 or the electrical contacts 332 to lose connection with the elongated contacts 14. This mechanical attachment may be achieved prior to the electrical engagement of the contacts within the continuous access busway. In one embodiment, the multi-component assembly 360 includes an insert member 362, a latch member 364, a detent 366 and a fastener 368. The insert member 362 may be inserted and rotated into engagement with both sides of the track 18 (See FIG. 10). The latch member 364 may be manipulated by the user to pivot the insert member 362. When the insert member 362 is engaged with the track 18, the latch member 364 may abut against the detent 366 to support the insert member 362 in position. The fastener 368 may be selectively tightened or loosened by hand or by a conventional tool such as a wrench or screwdriver to clamp the insert member 362 in place within the track 18. The insert member 362 may include flat sides to allow the insert member 362 to rotate about 90 degrees and abut against the walls 24 within the track 18 without over rotating. The insert member 362 and the latch member 264 may be pivotal about a common axis and be spaced from one another with a surface 370 positioned therebetween. The surface 370 may extend from a top portion of the tap box 320. A second multi-component assembly 360 may be provided an opposite side of the tap box 320 for secure attachment to the frame 18. This is merely an example of a multi-component assembly 360 as various fasteners, toggle clamps and other mounting variations are contemplated such as a sliding pin or magnetic mounting device.

Figure 10:
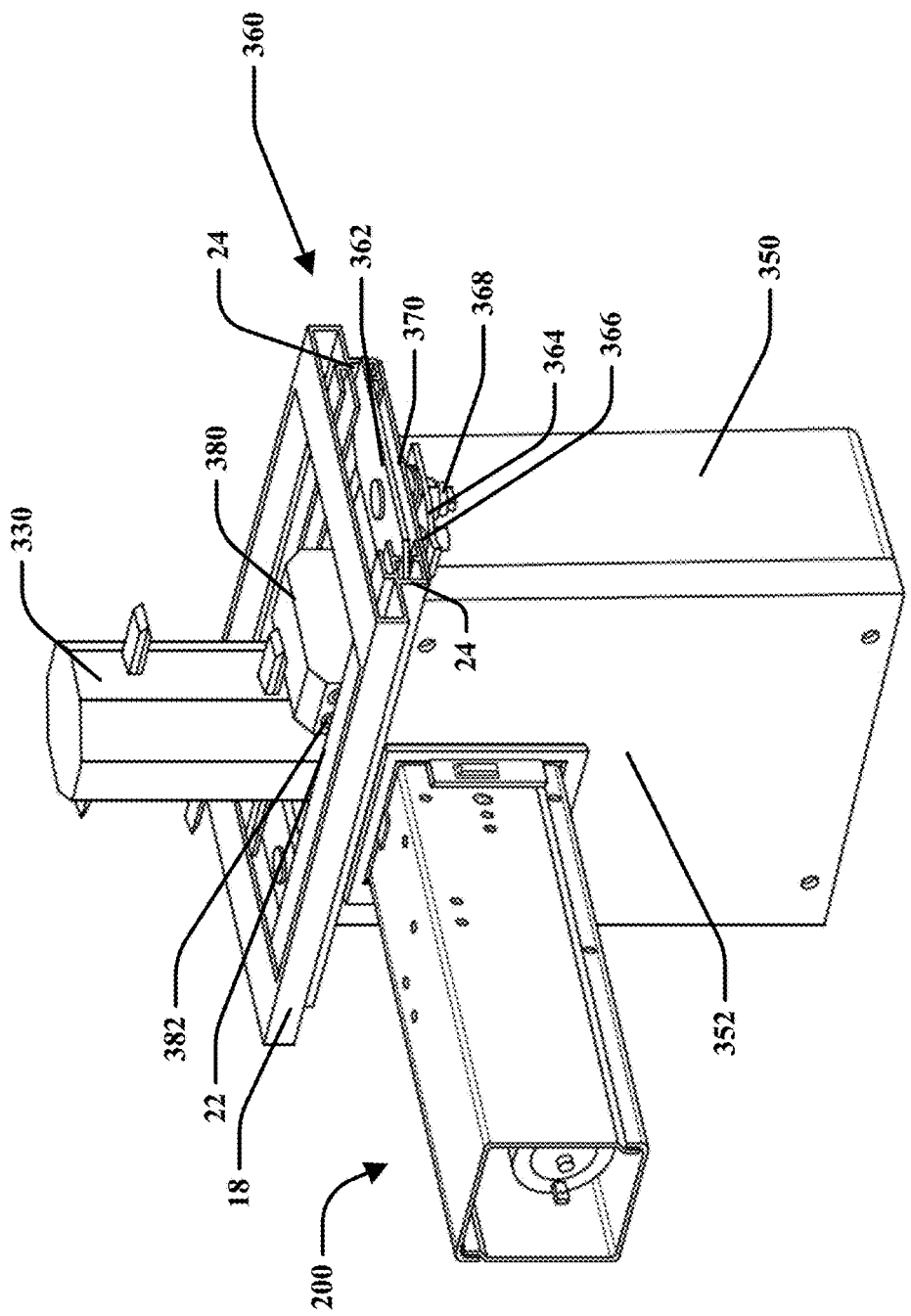
FIG. 10 is a perspective view of an embodiment of a side mounted powered actuator device and a tap box assembly attached to a portion of a continuous access busway in accordance with aspects of the present disclosure.

As illustrated by FIGS. 9 and 10, an alignment member 380 may also be attached to the tap box 320. The alignment member 380 may be a block or other protrusion that extends from the surface 370 upwardly and may include at least one detent 382. The alignment member 380 may be mounted on the body enclosure 350 adjacent the mast head 330 and be inserted within the continuous access busway 10 to allow for alignment of the electrical contacts 332 with the elongated contacts 14 of the continuous access busway 10. As illustrated by FIG. 10, the detents may press upon the one or both of the inwardly facing walls 22 of the track 18 when the mast head 330 is inserted into the continuous access busway 10. The alignment member 380 may ensure that the contacts 332 and contacts 14 are in proper alignment for operation of the power actuator device 200. The alignment member 380 may prevent unintended rotation of the tap box after being inserted within the cavity 18 of the continuous access busway 10 to prevent unintended electrical contact of components. The alignment member 380 may have various configurations including height, width, and location along the tap box to optimize the actuation of the mast head 330 and potential electrical contact of tap box at locations of insertion along the continuous access busway 10. The wired attachment between the remote controller and the remote control drive device may range between a length between about 10 feet to 20 feet or more to provide personal clearance for operation. Alternatively, if the remote control drive device is to be wirelessly controlled, then a battery may be included on the circuit board in addition to the wireless communication circuitry to be contained in both the remote controller and the remote control drive device.

Figure 11:
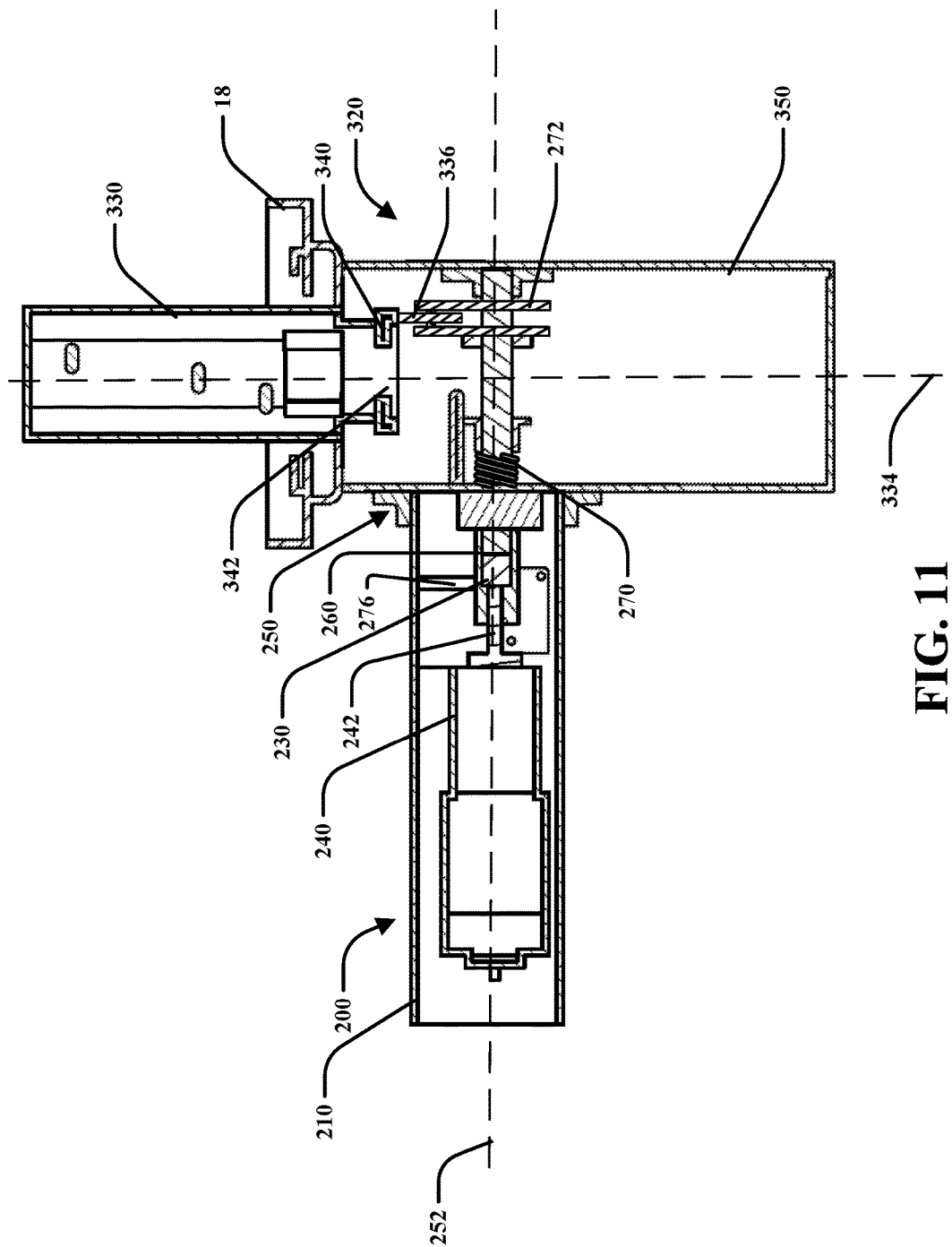
FIG. 11 is a cross sectional side view of another embodiment of the side mounted powered actuator device attached to a tap box assembly in accordance with the present disclosure.

FIG. 11 illustrates a cross sectional view of an embodiment of the tap box 350 connected to the powered actuator device 200 of FIG. 10. Illustrated is one embodiment of an internal mechanism configured to transfer rotation from the powered actuator device 200 to the mast head 330 to allow the mast head to rotate about the engagement axis 334 that is generally perpendicular to the rotation axis 252. The mechanical output interface coupling 230 is coupled to the link shaft 260 that extends within the body enclosure 350. Here the link shaft 260 is attached to a series of linkages to allow torque to be transferred from the drive shaft 242 of the motor 240 to the mast head 330 to allow for the proper amount of rotation, about 90 degrees, between the engaged position and the disengaged position.

The link shaft 260 includes a bias assembly 270 that provides a bias force that cooperates with the attachment member 250 such that the mechanical output interface coupling 230 remains sufficiently coupled to the link shaft 260 with the assistance of the bias force from the bias assembly 270. Additionally, the bias assembly 270 may include retaining clips that incorporate a spring washer so that the link shaft 260 may translate into a detent position to provide a positive coupling indication. A position indicator 276 may be attached to the motor 240, drive shaft 242 or interface coupling 230 to indicate to a user whether the tap box is between an engaged or disengaged position relative to the continuous access busway. A drive link 272 extends from the link shaft 260 and is aligned with an arm 336. The arm 336 extends from the bottom portion of the mast head 330. When the link shaft 260 is rotated, the drive link 272 pivots about the rotation axis 252 and engages against the arm 336 to rotate the mast head about the engagement axis 334. In this arrangement, a bottom 340 of the mast head 330 includes an opening 342 to allow for electrical wires to connect to the electrical contacts 332 to electrical distribution components (not shown) within the body enclosure 350 and allow for the mast head 330 to rotate relative to the body enclosure 350.

FIG. 12 illustrates a cross sectional view of another embodiment of the tap box 350 connected to the powered actuator device 200 of FIG. 10. However, in this embodiment, a different internal mechanism from FIG. 11 is used and configured to transfer rotation from the powered actuator device 200 to the mast head 330 to allow the mast head to rotate about the engagement axis 334 that is generally perpendicular to the rotation axis 252. Here, the mechanical output interface coupling 230 is coupled to the link shaft 260 that extends within the body enclosure 350. The link shaft 260 is attached to a series of gears to allow torque to be transferred from the drive shaft 242 of the motor 240 to the mast head 330 to allow for the proper amount of rotation, about 90 degrees, between the engaged position and the disengaged position.

The link shaft 260 includes the bias assembly 270 that provides a bias force that cooperates with the attachment member 250 such that the mechanical output interface coupling 230 remains sufficiently coupled to the link shaft 260 with the assistance of the bias force from the bias assembly 270. The position indicator 276 may be attached to the motor 240, drive shaft 242 or interface coupling 230 to indicate to a user the whether the tap box is between an engaged or disengaged position relative to the continuous access busway. A first gear 282 may be a bevel gear and include a plurality of teeth extends from the link shaft 260 in engaged alignment with a plurality of teeth along a second gear 338. The second gear 338 may be a bevel gear that coaxially extends from the bottom portion of the mast head 330 along the engagement axis 334. When the link shaft 260 is rotated, the first gear 282 pivots about the rotation axis 252 and engages the second gear 338 to rotate the mast head 330 about the engagement axis 334. In this arrangement, the bottom 340 of the mast head 330 includes an opening to allow for electrical wires to connect the electrical contacts 332 to electrical distribution components (not shown) within the body enclosure 350 and allow for the mast head 330 to rotate relative to the body enclosure 350.

Turning to FIGS. 13 and 14, illustrated is another embodiment of the tap box 320 with the powered actuator device 200 attached to a bottom 354 of the body enclosure 350. FIG. 13 illustrates that the powered actuator device 200 may be attached to the attachment member 250 along the bottom 354 of the body enclosure 350 and be in aligned along a common axis, the engagement axis 334, with the mast head 330. This configuration allows for a direct drive actuation of the mast head 330. FIG. 14 illustrates a cross sectional view of the tap box 320 of FIG. 13. In this embodiment, an internal mechanism is configured to transfer rotation from the powered actuator device 200 to the mast head 330 to allow the mast head to rotate about the engagement axis 334 that is generally aligned with the motor 240 and drive shaft 242 of the powered actuator device 200. The mechanical output interface coupling 230 is selectively coupled to the link shaft 260 that extends within the body enclosure 350. Here the link shaft 260 is attached to a drive member 390 to allow torque to be transferred from the drive shaft 242 of the motor 240 to the mast head 330 to allow for the proper amount of rotation, about 90 degrees, between the engaged positon and the disengaged position. The drive member 390 may be attached to the bottom 340 of the mast head 330 and define a cavity 392 in communication with the opening 342 in the bottom of the mast head 330. An aperture 394 is provided in the drive member 390. This arrangement allows for electrical wires to pass through the opening 342 and aperture 394 to connect the electrical contacts 332 to electrical distribution components (not shown) within the body enclosure 350 and allow for the mast head 330 to rotate relative to the body enclosure 350.

The link shaft 260 includes a bias assembly 270 that provides a bias force that cooperates with the attachment member 250 such that the mechanical output interface coupling 230 remains sufficiently coupled to the link shaft 260 with the assistance of the bias force from the bias assembly 270. The position indicator 276 may be attached to the motor 240, drive shaft 242 or interface coupling 230 to indicate to a user the whether the tap box is between an engaged or disengaged position relative to the continuous access busway.

The position indicator 276 of the powered actuator device 200 may include a visual position indication to indicate that the tap box input shaft is in or has been fully rotated into the "on" (engaged) or "off" (disengaged) position. The enclosure may also include position sensors such as limit switches or proximity switches to automatically turn off power to the motor 242 when the desired position has been reached. Optional sensors may be included for indicating the location on to the remote controller. Further, the gear drive may utilize various designs such as worm, spur, bevel, face spur, helical etc. and this disclosure is not limited.

In the embodiments described by FIG. 8-15, the mast head 320 is rotatable relative to the body enclosure 350. However, this system contemplates that the powered actuator device 200 may be selectively removeable from the tap box 320 and be used with remote actuator interfaces of existing tap boxes 20 including tap boxes having various types of adapter brackets 150 or attachment members 250 to move their electrical contacts using the powered actuator device 200.

In operation, once the male component 30 or mast head 330 is inserted into a cavity 16 of the continuous access busway 10, this may allow electrical contacts of the male component 30, 330 to be rotated and electrically connected to predetermined positions along the continuous access busway without rotation of the body enclosure 50, 350. In this embodiment, the linkage member 142, adapter bracket 150, attachment member 250, or link shaft 260 may be operated by a tool such as the elongated control rod and/or the powered actuator device.

Further, adapter bracket 150 or attachment member 250 may include a rotational converter that may provide a gear ratio to allow for a 45-degree operating rotation input that may enable easier manual operation due to limited access clearances. The input to output ratio may increase the speed of engagement of the electrical contacts thereby reducing the time for the electrical contacts to reach the full contact pressure position which will improve safety by mitigating the arc time in all modes of operation including manual or remote control. Further, the mechanical output interface coupling 230 may be keyed or telescoping to accommodate varying remote actuator interfaces including linkage members 142, link shaft 260, adapter bracket 150, attachment member 250 types and dimensions. The linkage member, link shaft, adapter bracket and attachment member may be collectively referred to herein as the remote actuator interface that may be positioned along the tap box for manipulating the male component between the engaged position and the disengaged position. Further, various embodiments disclosed by FIGS. 8 through 15 includes mechanical drive train components configured to transfer rotation from the powered actuator device to the male component. The mechanical drive train components may include at least one of a linkage connection (FIG. 11), a beveled gear connection (FIG. 12), and a direct drive connection (FIG. 14).

In various embodiments, the drive shaft 242 may be in a 1 to 1 mechanical rotational ratio with the male component 30 or mast head 330 as 90 degrees of rotation of the drive shaft 242 may allow for 90 degrees of rotation of the male component 30 or mast head 330. Alternatively, the adapter bracket 150 or attachment member 250 may also include the rotational converter that may allow for a 2 to 1 mechanical rotational ratio with the male component 30 or mast head 330. Here, about 45 degrees of rotation of the adapter bracket 150 or attachment member 250 may allow for about 90 degrees of rotation of the male component 30 or mast head 330. However, any desired rotational ratio may be adopted by the embodiments disclosed herein and this disclosure is not limited.

In this embodiment, the tap box assembly may first be secured (but not electrically connected) to the continuous access busway 10 by the multi-component assembly 360 and then the male component 30 or mast head 330 may be independently rotated via the elongated control rod 100 or the powered actuator device 200.

Although the present embodiments have been illustrated in the accompanying drawings and described in the foregoing detailed description, it is to be understood that the tap box assemblies are not to be limited to just the embodiments disclosed, but that the systems and assemblies described herein are capable of numerous rearrangements, modifications and substitutions. The exemplary embodiment has been described with reference to the preferred embodiments. Obviously, modifications and alterations will occur to others upon reading and understanding the preceding detailed description. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for remotely actuating a tap box to a continuous access busway comprising:
   a tap box having a male component with electric contacts positionable between an engaged position and a disengaged position;
   a remote actuator interface positioned along the tap box;
   a remote actuator device adapted to be selectively coupled to the remote actuator interface to manipulate the male component between the engaged position and the disengaged position relative to a continuous access busway.

2. The system of claim 1, wherein the remote actuator device includes at least one of a powered actuator device and an elongated control rod.

3. The system of claim 2, wherein the remote actuator device is the powered actuator device wherein the powered actuator device includes a motor and a drive shaft in rotatable communication with an output interface coupling that is selectively attachable to the remote actuator interface on the tap box.

4. The system of claim 2, wherein the remote actuator device is the powered actuator device wherein the powered actuator device includes at least one battery to power the motor.

5. The system of claim 2, wherein the remote actuator device is the powered actuator device wherein the powered actuator device is in a wired communication or a wireless communication with a remote controller.

6. The system of claim 2, wherein the remote actuator device is the elongated control rod wherein the elongated control rod includes a coupling head having an engagement interface that may be selectively attached to the remote actuator interface.

7. The system of claim 6, wherein the elongated control rod includes a plurality of coupling heads each having a different engagement interface wherein the plurality of coupling heads are selectively attachable to a stem member of the elongated control rod.

8. The system of claim 2, wherein the remote actuator device is the elongated control rod wherein the elongated control rod includes an elongated body having a handle along a proximal end and a universal joint along an opposite distal end, a stem portion attached to the universal joint and a coupling head with an engagement interface selectively attached to the stem portion wherein the universal joint allows the stem portion and the elongated body to pivot relative to one another.

9. The system of claim 1, wherein the remote actuator interface is a coupling device that includes at least one of a lever, knob, or shaft that extend from the tap box, a linkage member of the tap box, an adapter assembly, and an attachment member.

10. An assembly for remotely actuating a tap box relative to a continuous access busway comprising:
    a powered actuator device including a housing, a motor or solenoid, a drive shaft and a mechanical output interface coupling; and
    a remote controller in communication with the powered actuator device to selectively actuate the motor to rotate the drive shaft;
    wherein the powered actuator device is adapted to be selectively coupled to a remote actuator interface of a tap box to manipulate a male component between an engaged position and a disengaged position relative to a continuous access busway.

11. The assembly of claim 10 further comprising:
    a tap box having a male component with electric contacts positionable between an engaged position and a disengaged position; and
    a remote actuator interface positioned along the tap box wherein the powered actuator device is configured to be selectively attached to the remote actuator interface to manipulate the male component between the engaged position and the disengaged position.

12. The assembly of claim 10, wherein the remote actuator interface is a coupling device that includes at least one of a lever, knob, or shaft that extends from the tap box, a linkage member of the tap box, an adapter assembly, and an attachment member.

13. The assembly of claim 12, wherein the tap box includes mechanical drive train components configured to transfer rotation from the powered actuator device to the male component.

14. The assembly of claim 13, wherein the male component is a mast head that is pivotal relative to a body enclosure of the tap box.

15. The assembly of claim 13, wherein the mechanical drive train components includes at least one of a linkage connection, a beveled gear connection, and a direct drive connection that are in communication with the remote actuator interface.

16. The assembly of claim 10, wherein the powered actuator device is selectively removable from a tap box.

17. The assembly of claim 10, wherein the remote controller is in at least one of a wireless communication with the powered actuator device wherein the powered actuator device includes at least one battery and a wired communication with the powered actuator device wherein at least one of the remote controller and the powered actuator device includes at least one battery.

18. A tap box assembly for remotely actuating electrical contacts to a continuous access busway comprising:
 a tap box having a body enclosure and a male component extending from the body enclosure with electric contacts positionable between an engaged position and a disengaged position; and
 a remote actuator interface positioned along the body enclosure and in communication with mechanical drive train components for manipulating the male component between the engaged position and the disengaged position;
 wherein the remote actuator interface is selectively attachable to a remote actuator device for selectively actuating the mechanical drive train components.

19. The assembly of claim 18, wherein the male component is a mast head that is pivotal relative to a body enclosure of the tap box and further comprises an alignment member attached to the body enclosure of the tap box wherein the alignment member is configured to be inserted within the continuous access busway to align a plurality of electrical contacts from the mast head with a plurality of elongated contacts of the continuous access busway.

20. The assembly of claim 18, wherein the mechanical drive train components include at least one of a linkage connection, a beveled gear connection, and a direct drive connection.

21. The assembly of claim 18, wherein the remote actuator interface is a coupling device that includes at least one of a lever, knob, or shaft that extends from the tap box, a linkage member of the tap box, an adapter assembly, and an attachment member.

\* \* \* \* \*